United States Patent
Konig et al.

(10) Patent No.: US 10,116,799 B2
(45) Date of Patent: Oct. 30, 2018

(54) ENHANCING WORK FORCE MANAGEMENT WITH SPEECH ANALYTICS

(71) Applicant: GENESYS TELECOMMUNICATIONS LABORATORIES, INC., Daly City, CA (US)

(72) Inventors: Yochai Konig, San Francisco, CA (US); Herbert Willi Artur Ristock, Walnut Creek, CA (US); David Konig, Tel Aviv (IL)

( * ) Notice: Subject to any disclaimer, the term of this patent is extended or adjusted under 35 U.S.C. 154(b) by 349 days.

(21) Appl. No.: 14/320,237

(22) Filed: Jun. 30, 2014

(65) Prior Publication Data
US 2015/0381807 A1 Dec. 31, 2015

(51) Int. Cl.
*H04M 3/523* (2006.01)
*G06Q 10/06* (2012.01)

(52) U.S. Cl.
CPC .. *H04M 3/5233* (2013.01); *G06Q 10/063112* (2013.01); *H04M 2203/402* (2013.01)

(58) Field of Classification Search
CPC ............ H04M 3/5175; H04M 3/5233; H04M 3/5232; H04M 3/5238; G06Q 10/063112; G06Q 10/063116
USPC ............ 379/265.03, 265.05, 265.06, 265.12, 379/266.08
See application file for complete search history.

(56) References Cited

U.S. PATENT DOCUMENTS

| | | | |
|---|---|---|---|
| 7,023,979 B1 * | 4/2006 | Wu | H04M 3/5233 379/265.11 |
| 7,487,094 B1 | 2/2009 | Konig et al. | |
| 7,864,946 B1 * | 1/2011 | Fama | H04M 3/5175 379/265.02 |
| 8,108,237 B2 | 1/2012 | Bourne et al. | |
| 8,396,732 B1 * | 3/2013 | Nies | G06Q 10/06 705/7.12 |
| 2003/0081757 A1 * | 5/2003 | Mengshoel | H04M 3/5233 379/265.06 |
| 2006/0062376 A1 | 3/2006 | Pickford | |
| 2007/0276713 A1 * | 11/2007 | Lee | G06Q 10/06 705/7.14 |

(Continued)

FOREIGN PATENT DOCUMENTS

KR 100847162 A 7/2008

OTHER PUBLICATIONS

International Search Report and Written Opinion dated Sep. 30, 2015, for Application No. PCT/US2015/038660, 12 pgs.

*Primary Examiner* — Antim G Shah

(57) ABSTRACT

A method for generating an agent work schedule includes: analyzing, on a processor, a plurality of recorded interactions with a plurality of contact center agents to classify the recorded interactions based on a first plurality of interaction reasons and a plurality interaction resolution statuses; analyzing, on the processor, the classified recorded interactions to compute agent effectiveness of an agent of the plurality of agents, wherein the agent effectiveness corresponds to an interaction reason of the first interaction reasons; forecasting, on the processor, a demand of the contact center agents for a first time period for handling interactions classified with the interaction reason; and generating, on the processor, the agent work schedule for the first time period based on the forecasted demand and the computed agent effectiveness.

21 Claims, 9 Drawing Sheets

(56) References Cited

U.S. PATENT DOCUMENTS

| | | | |
|---|---|---|---|
| 2010/0076898 A1* | 3/2010 | Beshears | G06Q 10/06 705/301 |
| 2013/0030854 A1 | 1/2013 | McCormack et al. | |
| 2013/0202100 A1* | 8/2013 | Fagundes | H04M 3/523 379/265.1 |
| 2014/0211932 A1* | 7/2014 | Zhao | H04M 3/5175 379/265.06 |
| 2014/0324499 A1 | 10/2014 | Placiakis et al. | |
| 2015/0117632 A1 | 4/2015 | Konig et al. | |

* cited by examiner

Call Reason Distribution

| Category | Percent of Calls | | Calls | Avg. Duration |
|---|---|---|---|---|
| Billing Issue | 40.7% | ☑ | 1522 | 40:33 |
| Equipment Issue | 29.8% | ☑ | 1113 | 42:21 |
| Make Payment | 27.4% | ☑ | 1023 | 41:10 |
| Account Balance | 24.7% | ☑ | 923 | 42:59 |
| Network Issue | 21.5% | ☑ | 805 | 41:05 |
| Activation | 12.5% | ☑ | 466 | 39:45 |
| Voicemail | 11.4% | ☑ | 426 | 36:19 |
| Lost and Stolen | 10.2% | ☑ | 380 | 43:38 |
| Messaging | 9.3% | ☑ | 349 | 39:47 |
| Downloads | 8.9% | ☑ | 332 | 40:05 |
| Wireless Web | 8.2% | ☑ | 306 | 40:13 |
| Payment Option | 6.3% | ☑ | 237 | 44:18 |
| Cancel Account | 5.6% | ☑ | 208 | 41:02 |
| Extended Warranty | 5.4% | ☑ | 200 | 39:56 |
| Restrict Service | 4.6% | ☑ | 172 | 38:26 |
| Update Account | 2.1% | ☑ | 78 | 39:43 |
| Spending Limit | 2.0% | | 73 | 37:48 |
| Fee Adjustment | 1.6% | | 60 | 45:15 |
| Summary | 89.3% | | 3338 | 38:39 |

FIG. 4

ENHANCING WORK FORCE MANAGEMENT WITH SPEECH ANALYTICS

BACKGROUND

Staffing costs represent a large portion (e.g., 60-70%) of the total expenditures in a contact center. Achieving the right staffing level in the contact center helps to balance costs with customer service. Overstaffed contact centers needlessly increase costs, while understaffed contact centers result in lower levels of customer satisfaction.

It is therefore desirable to accurately predict the amount of work that will come in to a contact center and match that work with sufficient staff having appropriate skills to handle the work load. However, this scheduling process can be a complex and time consuming job. Accordingly, what is desired is a system and method for aiding the forecast of contact center work load and to schedule staff to handle the forecasted load.

Traditional contact center work force management (WFM) software provides functionality such as forecasting, scheduling, and tracking to increase the efficiency of an available pool of agents (labor). These offerings have more recently been expanded to address the needs of multi-site, multi-skill, and multi-channel environments.

SUMMARY

Embodiments of the present invention are directed to a system and method for enhancing work force management by evaluating agent effectiveness at handling various types of calls, forecasting contact center work load in terms of volume of calls with particular call reasons, and generating an agent work schedule based on the forecasted work load and computed agent effectiveness.

According to one embodiment, a method for generating an agent work schedule includes: analyzing, on a processor, a plurality of recorded interactions with a plurality of contact center agents to classify the recorded interactions based on a first plurality of interaction reasons and a plurality interaction resolution statuses; analyzing, on the processor, the classified recorded interactions to compute agent effectiveness of an agent of the plurality of agents, wherein the agent effectiveness corresponds to an interaction reason of the first interaction reasons; forecasting, on the processor, a demand of the contact center agents for a first time period for handling interactions classified with the interaction reason; and generating, on the processor, the agent work schedule for the first time period based on the forecasted demand and the computed agent effectiveness.

The analyzing, on the processor, the plurality of recorded interactions may further include determining, on the processor, an interaction handling time, and the agent effectiveness may include an average interaction handling time computed from the interaction handling time.

The agent work schedule may be further generated based on an average tare time.

The analyzing the classified recorded interactions to compute the agent effectiveness of the agent may include: identifying, on the processor, from among the plurality of recorded interactions, a subset of recorded interactions in which the agent participated in the recorded interaction and which were classified with the interaction reason; identifying, on the processor, from among the subset of recorded interactions, a plurality of unresolved interactions in which an interaction resolution status of the interaction resolution statuses associated with the subset of recorded interactions is set as unresolved; and computing, on the processor, the agent effectiveness with respect to the interaction reason based on a number of unresolved recorded interactions and a number of interactions in the subset of recorded interactions.

The method may further include updating, on the processor, the computed agent effectiveness by analyzing a second plurality of recorded interactions to classify the second plurality of recorded interactions based on a second plurality of interaction reasons and a second plurality of interaction resolution statuses.

The second interaction reasons may include at least one new interaction reason different from each of the first interaction reasons.

The analyzing the classified recorded interactions to compute agent effectiveness of the agent may include: identifying, on the processor, from among the plurality of recorded interactions, a subset of recorded interactions in which the agent participated in the recorded interaction and which were classified with the at least one new interaction reason; identifying, on the processor, from among the subset of recorded interactions, a plurality of unresolved interactions in which an interaction resolution status of the interaction resolution statuses associated with the subset of recorded interactions is set as unresolved; and computing, on the processor, the agent effectiveness with respect to the at least one new interaction reason based on a number of unresolved recorded interactions and a number of interactions in the subset of recorded interactions.

The method may further include forecasting, on the processor, a demand of the contact center agents for a second time period for handling interactions classified with the new interaction reason, the second time period being different from the first time period.

The first interaction reasons may include at least one interaction obsolete interaction reason different from each of the second interaction reasons.

The method may further include forecasting, on the processor, a demand of the contact center agents for a second time period for handling the second interaction reasons without forecasting a demand for handling the at least one obsolete interaction reason, the second time period being different from the first time period.

According to one embodiment of the present invention, a system may include: a processor; and memory storing instructions that, when executed on the processor, cause the processor to: analyze a plurality of recorded interactions with a plurality of contact center agents to classify the recorded interactions based on a first plurality of interaction reasons and a plurality interaction resolution statuses; analyze the classified recorded interactions to compute agent effectiveness of an agent of the plurality of agents, wherein the agent effectiveness corresponds to an interaction reason of the first interaction reasons; forecast a demand of the contact center agents for a first time period for handling interactions classified with the interaction reason; and generate the agent work schedule for the first time period based on the forecasted demand and the computed agent effectiveness.

The memory may further store instructions that, when executed by the processor, cause the processor to determine an interaction handling time, wherein the agent effectiveness includes an average interaction handling time computed from the interaction handling time.

The agent work schedule may be further generated based on an average tare time.

The instructions stored in the memory that cause the processor to analyze the classified recorded interactions to compute the agent effectiveness may include instructions that, when executed by the processor, cause the processor to: identify, from among the plurality of recorded interactions, a subset of recorded interactions in which the agent participated in the recorded interaction and which were classified with the interaction reason; identify, from among the subset of recorded interactions, a plurality of unresolved interactions in which an interaction resolution status of the interaction resolution statuses associated with the subset of recorded interactions is set as unresolved; and compute the agent effectiveness with respect to the interaction reason based on a number of unresolved recorded interactions and a number of interactions in the subset of recorded interactions.

The memory may further store instructions that, when executed by the processor, cause the processor to update the computed agent effectiveness by analyzing a second plurality of recorded interactions to classify the second plurality of recorded interactions based on a second plurality of interaction reasons and a second plurality of interaction resolution statuses.

The second interaction reasons may include at least one new interaction reason different from each of the first interaction reasons.

The instructions stored in the memory that cause the processor to compute agent effectiveness of the agent may include instructions that, when executed by the processor, cause the processor to: identify, from among the plurality of recorded interactions, a subset of recorded interactions in which the agent participated in the recorded interaction and which were classified with the at least one new interaction reason; identify, from among the subset of recorded interactions, a plurality of unresolved interactions in which an interaction resolution status of the interaction resolution statuses associated with the subset of recorded interactions is set as unresolved; and compute the agent effectiveness with respect to the at least one new interaction reason based on a number of unresolved recorded interactions and a number of interactions in the subset of recorded interactions.

The memory may further store instructions that, when executed by the processor, cause the processor to forecast a demand of the contact center agents for a second time period for handling interactions classified with the new interaction reason, the second time period being different from the first time period.

The first interaction reasons may include at least one interaction obsolete interaction reason different from each of the second interaction reasons.

The memory may further store instructions that, when executed by the processor, cause the processor to forecast a demand of the contact center agents for a second time period for handling the second interaction reasons without forecasting a demand for handling the at least one obsolete interaction reason, the second time period being different from the first time period.

BRIEF DESCRIPTION OF THE DRAWINGS

The accompanying drawings, together with the specification, illustrate exemplary embodiments of the present invention, and, together with the description, serve to explain the principles of the present invention.

FIG. 4 is an illustration of a call reason report generated in a system according to one embodiment of the present invention.

DETAILED DESCRIPTION

Figure 1:
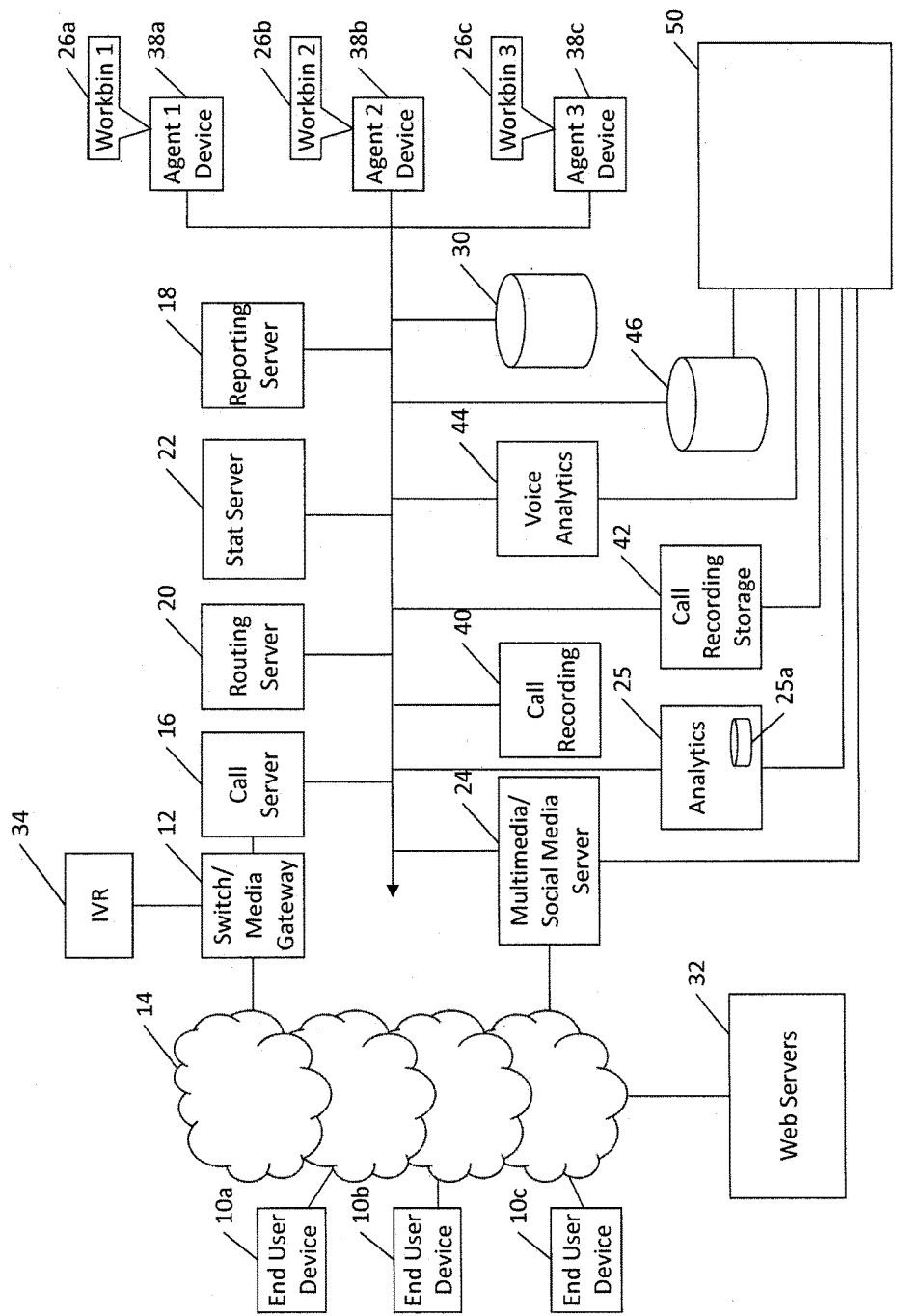
FIG. 1 is a schematic diagram illustrating a contact center that includes or uses an embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In traditional work force management (WFM) systems, information about the skills of agents (e.g., languages spoken, product knowledge, or the ability to handle multiple contact cannels) is matched against the expected volume of contacts in terms of channel, language, and broad (or gross) interaction reasons. The broad (or gross) interaction reasons may include categories such as customer service, new accounts, technical support, sales, etc. Forecasting is generally performed based on analysis and modeling of historical data. The historical broad interaction reasons may be inferred based on a customer's interactive voice response (IVR) menu selections, dialed number identification service (DNIS), agent wrap code for calls, etc.

Aspects of embodiments of the present invention are directed to a system and method for automatically aiding the forecast of contact center work load and to schedule staff to handle the forecasted workload, where the forecasting and scheduling are performed based on highly granular call reasons (e.g., particular problems with specific products, sales of particular product lines, etc). For example, where a traditional system might include categories or interaction reasons such as "billing," "customer service," and "technical support," systems according to embodiments of the present invention may make use of more granular sub-categories or sub-interaction reasons such a "double charge," "change payment method," and "partial payment," all of which might have been previously generically classified as "billing."

In addition, the volume of interactions (e.g., phone calls, chat sessions, emails, etc.) associated with particular reasons may vary over time over time. For example, a contact center may encounter a higher volume of sales calls during regular business hours than after hours, while technical support calls may be more frequent later in the day and on weekends. Product support calls and complaints may also be more shortly after the release of a new product. In addition particular forms of interactions may be favored during particular hours. For example, the volume of telephone calls may be greater during business hours, but the volume of chat interactions may be greater in the evenings.

Furthermore, contact center agents have varying levels of effectiveness in successfully resolving different types of customer issues. For example, some contact center agents may be more effective at solving customer problems involving accessing the system using a mobile device, while other contact center agents are more effective at solving customer problems with the web interface. Still other contact center agents may be more effective at sales for particular product lines. In some embodiments, an agent's effectiveness can be measured by the number of calls that the agent can resolve in a given amount of time, or the length of time the agent spends on each call before the customer issue is resolved favorably.

Therefore, when generating a work schedule for agents of a contact center, it is desirable to schedule an appropriate number of agents having a combined total effectiveness with regard to a set of skills to be able to handle the forecasted volume of calls in the forecasted call reasons.

For example, if a large volume of sales calls regarding a newly released product are expected, it might not be sufficient to schedule a correspondingly large number of contact center agents if those agents are not well versed in the new product or if those agents are primarily trained in customer support. As another example, a highly skilled customer support agent may be able to favorably handle three times the number of calls that less experienced agents are capable of. As such, embodiments of the present invention may be configured to automatically schedule fewer customer agents to be working while the highly skilled agent is working in order to avoid overcapacity.

FIG. 1 is a schematic block diagram of a system for supporting a contact center in providing contact center services according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling components of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, co-browsing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 20 may query the customer information from the customer database via an ANI or any other information collected by the IMR 34 and forwarded to the routing server by the call server 18.

Once an appropriate agent is available to handle a call, a connection is made between the caller and the agent device 38a-38c (collectively referenced as 38) of the identified agent. Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20, and further based on information about agent availability, skills, and other routing parameters provided, for example, by a statistics server 22.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

The contact center may further include the previously described call recording server 40, the call recording storage module 42, voice analytics server 44, call success information storage module 46, and work force management module 50.

The contact center may also include a multimedia/social media server 24 configured to allow agent devices 38 to access communications channels on multimedia channels (e.g., Google® Talk, Google® Hangouts, Skype®, Jabber, SMS, etc.) and social media services (e.g., Twitter®, Facebook®, LinkedIn®, etc.).

According to one embodiment, the system also includes an analytics server (or configuration server) 25 which in turn includes a speech analytics module, call inference module, and a performance metric module. In some embodiments, the analytics server 25 further includes or is connected to an agent skill database 25a. Each module may be implemented via computer instructions that are stored in memory and executed by a processor for providing particular functionality. The operations of the analytics server 25 and the modules therein are described in more detail in U.S. patent application Ser. No. 14/068,959 "System and method for performance-based routing of interactions in a contact center," the entire disclosure of which is incorporated herein by reference.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

As such, aspects of embodiments of the present invention are directed to systems for automatically analyzing the content of recorded interactions (e.g., calls and text based chats) with contact centers to determine interaction reasons at a very detailed (or granular) level and interaction resolution statuses, determining agent effectiveness on a per granular interaction reason basis, refining agent effectiveness based on further analysis of interactions, forecasting future interaction volume using the granular interaction reasons, and scheduling agents based on the automatically forecasted interaction volume and the automatically determined agent effectiveness.

Figure 2:
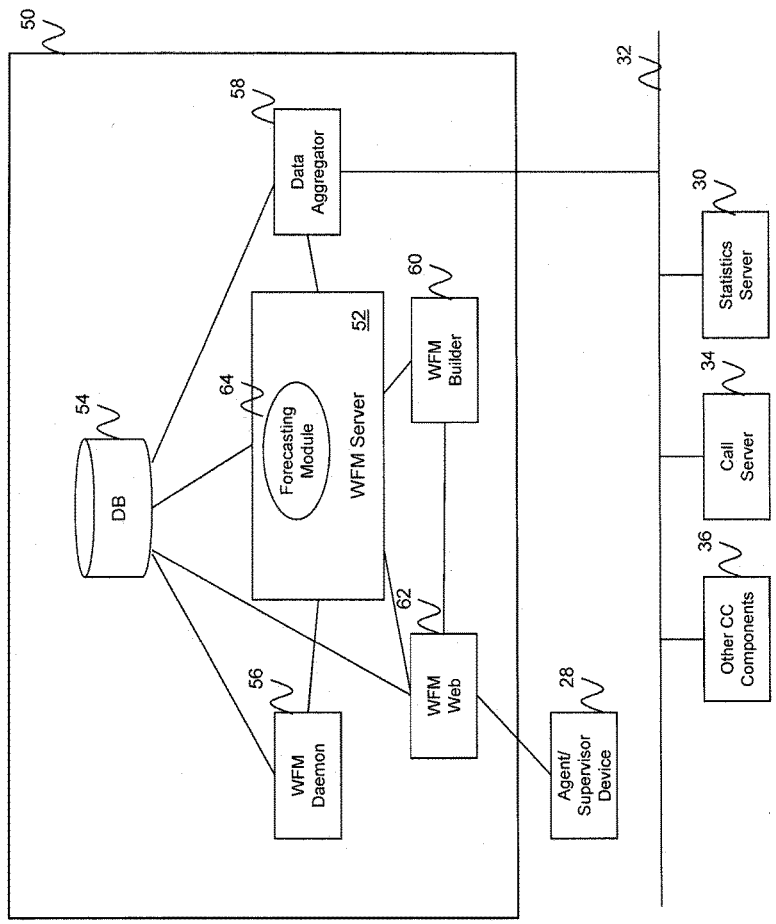
FIG. 2 is a schematic block diagram of a work force management (WFM) system according to one embodiment of the present invention.

FIG. 2 is a schematic block diagram of a work force management (WFM) system according to one embodiment of the present invention. The WFM system 50 includes a WFM server 52 coupled to a mass storage device (DB) 54, WFM daemon 56, WFM data aggregator 58, WFM builder 60, and WFM web component 62. The mass storage device 54 may be any hard disk drive or drive array for storing relevant configuration, forecasting, scheduling, agent adherence, performance, and historical data related to WFM. The WFM server 52 may be configured to process, store, and retrieve such data from the mass storage device 54 based on requests from the WFM web component 52. For example, the WFM web component 62 may receive requests from agents and supervisors relating to work force management, and forward those requests to the WFM server 52 for processing. According to one embodiment, the WFM server 12 includes a forecasting module 64. the forecasting module 64 may be implemented via computer program instructions stored in memory which, when executed by a processor, cause the processor to provide various forecasting functionalities including the ones described herein. The WFM server 52 may also include other modules for providing other WFM functionality, such as, for example, an adherence module for real-time monitoring of adherence to as schedule by the contact center employees, and/or a performance module for analyzing performance of the employees. The operation of various components of the WFM server is described, for example, in more detail in U.S. patent application Ser. No. 13/872,027 "System and method for automatic shrinkage forecasting," the entire disclosure of which is incorporated herein by reference.

Figure 3:
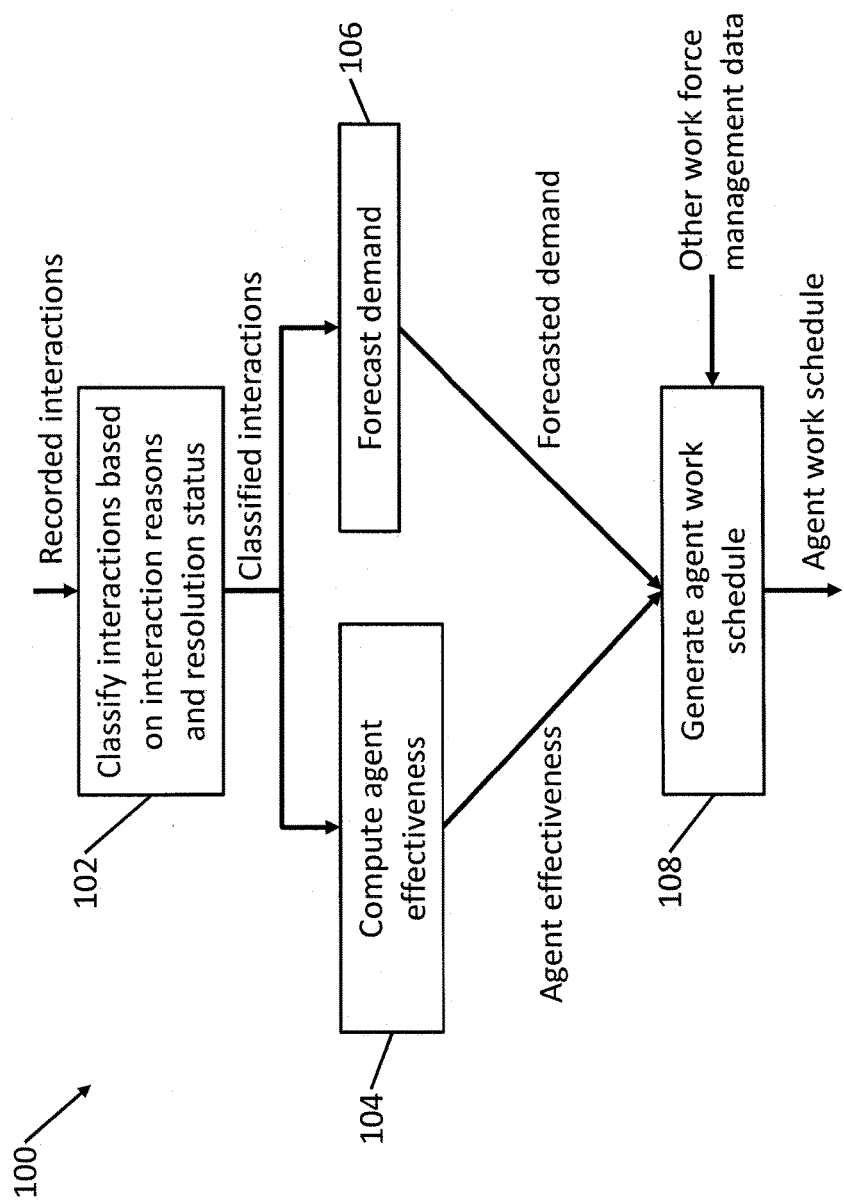
FIG. 3 is a flowchart illustrating a method for generating an work schedule from a set of recorded interactions

FIG. 3 is a flowchart illustrating a method 100 for generating an agent work schedule by a work force management module 50 according to one embodiment of the present invention. Referring to FIG. 3, in operation 102, the recorded interactions are analyzed and classified based on determined interaction reasons and resolution status. For example, when the interactions are chat or social media interactions, the multimedia/social media server 24 may perform analytics on the transcripts of the recorded interactions to determine the subject matter of the interactions and whether the agent was able to resolve the customer issue. Similarly, in the case of recorded voice interactions, the voice analytics module 44 may be configured to detect words or phrases during the interaction that cause the interaction to be classified with particular call reasons (e.g., DVR programming, extended warranty, lost or stolen devices, etc.) and whether the agent was able to resolve the customer issue. In some embodiments, aggregated analytics data regarding the interactions is provided by the analytics server 25.

In operation 104, the classified interactions are processed by the work force management system 50 to compute agent effectiveness, and in operation 106, the classified interactions are used to forecast future demand on a granular basis. In operation 108, the computed agent effectiveness is combined with other work force management data (e.g., agent working hours preferences, agent sick time or vacation time, etc.) is combined with the forecasted demand data for a particular time period to generate agent work schedule for the particular time period. These operations will be described in more detail below.

Referring to the classifying of interactions in operation 10, aspects of embodiments of the present invention are directed to inferring granular information regarding interaction (or call) reason by analyzing recorded interactions supplied from, for example, the multimedia/social media server 24, the call recording storage 42, and the voice analytics module 44. Such inferred call reasons are more granular than customer IVR selections, dialed number identification service (DNIS) (e.g., determining whether the customer dialed the "support" number versus the "sales" number), and agent wrap code.

In more detail, the granular interaction information can be inferred from by automatically analyzing the transcripts of text chat histories received from the social media server 24 and from automatically generated voice analytics data from the voice analytics module 44. Systems and methods for automatically recognizing call reasons from recorded interactions are described in more detail in U.S. Pat. No. 7,487,094 "System and method of call classification with context modeling based on composite words," the entire content of which is incorporated herein by reference. FIG. 4 is an example of a granular call reason (or interaction reason) report generated according to techniques described in the above applications.

For example, during an interaction, the caller may ask the agent "How do I program my DVR from my mobile phone?" The agent may respond "I can't help you with this—you might want to visit our website." Such an interaction would be automatically analyzed to infer that the call related to operating a DVR from a mobile device and that the customer issue was not resolved.

Generally speaking the interaction can be classified with an interaction reason, where the interaction reason includes a number of phrases. For example, the "Where's my stuff" interaction reason may include the phrases "I haven't received this shipment" "I should have received it yesterday" and "Where's my order?" As such, an interaction that contained any of these phrases would be classified with the "where's my stuff" call reason.

In addition, interactions are classified based on whether the agent was successful in addressing the customer's issue. For example, a customer saying "Thanks, I'll look forward to receiving my package tomorrow" would indicate that the agent succeeded in addressing the customer's question about the status of the customer's order.

In operation 104, the classified interactions are used to compute the effectiveness of each agent in each of the categories.

Figure 5:
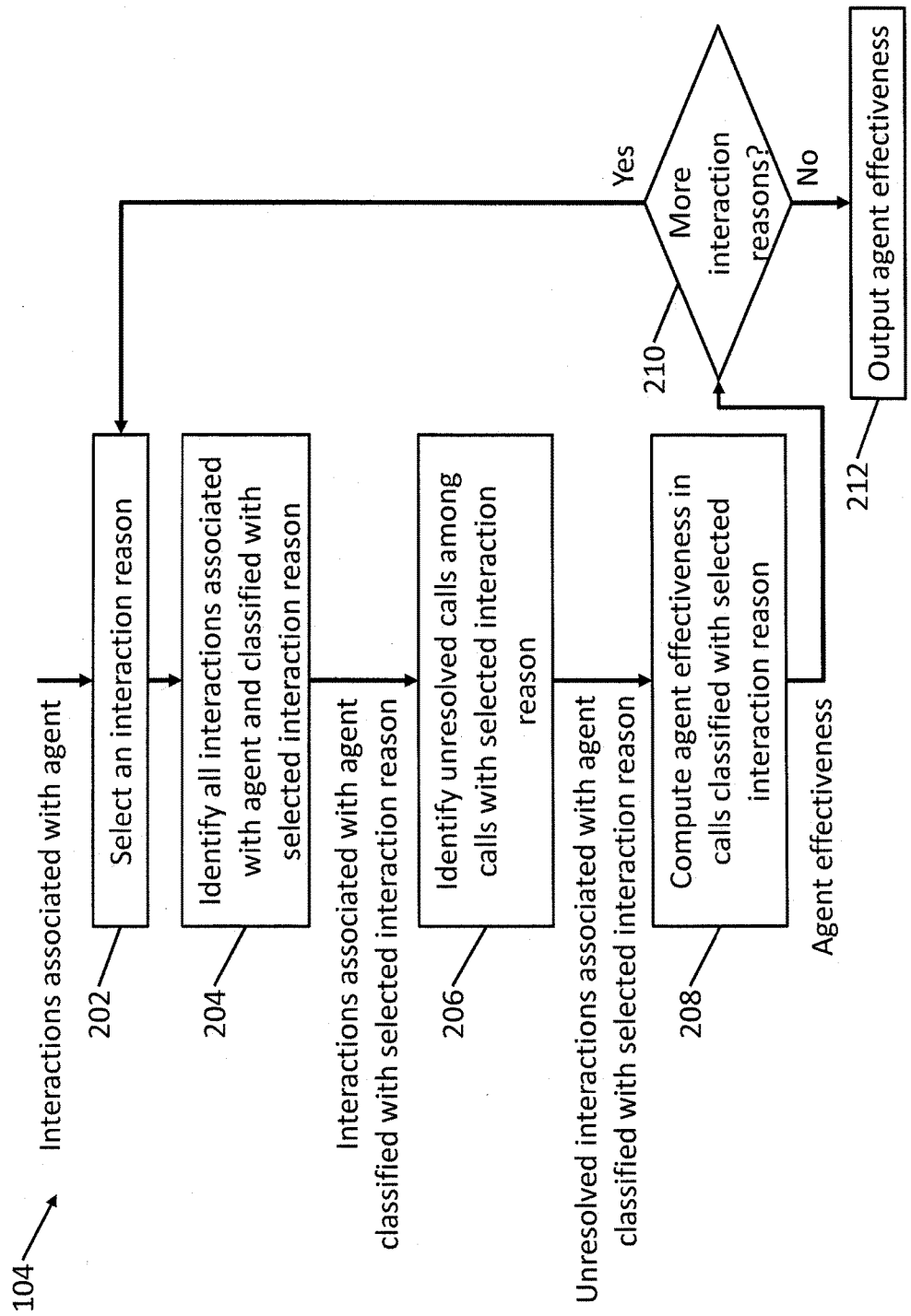
FIG. 5 is a flowchart illustrating a method for computing the effectiveness of a particular agent according to one embodiment of the present invention.

FIG. 5 is a flowchart illustrating a method for computing the effectiveness of a particular agent according to one embodiment of the present invention, which may be a sub-operation of operation 104 (see FIG. 3). The process is repeated for each of the agents in the pool of agents of the contact center. The work force management module 50 begins by identifying the recorded interactions that the agent participated in (e.g., ALL_CALLS_OF_AGENT_SMITH). From there, in operation 202, an interaction reason is selected from all of the interaction reasons. In operation 204, all of the interactions associated with the agent and classified with the selected interaction region are identified (CALLS_OF_AGENT_SMITH_ON_SPENDING_LIMIT). In operation 206, all of the calls that were classified with the selected interaction reason that were not resolved (e.g., classified with interaction resolution status of "unresolved") are also identified (UNRESOLVED_CALLS_OF_AGENT_SMITH_ON_SPENDING_LIMIT). In operation 208, the agent's effectiveness with regard to the selected interaction reason (or the agent's effectiveness in the skill associated with the interaction reason) is computed as a fraction (or percentage or other value from 0 to 1 inclusive) of unresolved calls:

$$\frac{\text{UNRESOLVED\_CALLS\_OF\_AGENT\_SMITH\_ON\_SPENDING\_LIMIT}}{\text{CALLS\_OF\_AGENT\_SMITH\_ON\_SPENDING\_LIMIT}} \times 100\%$$

According to other embodiments of the present invention, the effectiveness of the agent in an interaction reason is calculated in operation 208 by computing the intersection between calls of an agent relating to that interaction reason and all unresolved calls of the agent:

$$\frac{\text{CALLS\_OF\_AGENT\_SMITH\_ON\_SPENDING\_LIMIT} \cap \text{UNRESOLVED\_CALLS\_OF\_AGENT\_SMITH}}{\text{CALLS\_OF\_AGENT\_SMITH\_ON\_SPENDING\_LIMIT}} \times 100\%$$

In still other embodiments of the present invention, the effectiveness of the agent in an interaction reason is measured as a fraction of interactions resolved (rather than unresolved).

In operation 210, the work force management module 50 determines whether there are more interaction reasons to process. If so, then the procedure returns to operation 202 in which the next interaction reason is selected and the process repeats for the next interaction reason. If there are no more interaction reasons, then the computed agent effectiveness are outputted in operation 212, where each computed agent effectiveness is associated with a corresponding interaction reason (e.g., the effectiveness of the agent in resolving the issue associated with the interaction reason), such that multiple agent effectiveness metrics are computed for each agent (e.g., on an interaction reason by interaction reason basis). In one embodiment, the computed agent effectiveness metrics are stored in the agent skill database 25a of the analytics server 25.

In some embodiments of the present invention, when determining whether an interaction (or call) was resolved or not, the time at which the interaction was resolved is also noted. As such, an agent's time to resolution (or interaction handling time or "net" time) for each interaction (if the interaction was resolved) can be determined and an average time to resolution (or average interaction handling time or average net time) can be computed for each agent as part of the metric of the agent's effectiveness. The total time spent on an interaction may be referred to as the "gross" time, and time spent outside of call addressing the issue may be referred to as "tare" time (e.g., gross time=net time+tare time). Tare time may be beneficial by, for example, strengthening relationships between the company represented by the contact center. The length of the tare time may vary based on a number of factors, including the time of day, time of year, day of week, caller location, customer service level, etc.

Furthermore, customer satisfaction after the call can be evaluated (e.g., using a survey) and per agent customer satisfaction ratings (CSAT) can be used to further measure agent effectiveness.

Agent effectiveness can also be updated over time as additional interactions are processed by the multimedia/social media server 24, the voice analytics system 44, and the work force management system 50. For example, agent effectiveness can change if the agent reduces (or increases) the fraction of calls that end unresolved or if the agent decreases (or increases) the average call handling time.

The agent effectiveness can also be updated to include newly automatically identified interaction reasons (or skills for dealing with these issues) and sub-categories of interaction reasons (e.g., specific types of problems encountered by uses of a product line and sub-skills for dealing with these issues). For example, new skills or sub-skills that are associated with particular interaction reasons (e.g., not previously detected interaction reasons) can be introduced (automatically or manually) and agent effectiveness with regard to these new skills can be evaluated using the method described above with respect to FIG. 5. For example, if a recent software update introduced a new type of unknown error and a number of interactions were conducted regarding this new error, then a new granular interaction reason different from those of the previous set of granular interaction reasons (e.g., not among the previous set of granular interaction reasons) would be detected for this error.

In addition, interaction reasons that stop appearing (e.g., no calls are being categorized with those interaction reasons) can be marked as obsolete (or obsolete skills). As such, when computing agent effectiveness and generating work schedules in future periods, demand for the obsolete interaction reasons is not computed (e.g., the forecasts and the work schedules can be generated without considering the obsolete interaction reasons).

Embodiments of the present invention also directed to methods for generating, in operation 108, agent work schedules given projected call volume and for the projected distribution of granular interaction (or call) reasons for a particular time period (or scheduling period) as well as computed agent effectiveness. Embodiments of the present invention also account for other work force management data such as agent vacation time, scheduling requests and shifts, scheduled meetings and trainings, and other obligations and constraints on agent time such as legally mandated break times, limits on working hours, and overtime pay.

According to one embodiment of the present invention, the agent effectiveness data, combined with agent skill data, may be stored in the agent skill database 25a. The data in the agent skill database may be shared for use in routing interactions to agents based on skills (as described in, for example, U.S. patent application Ser. No. 14/068,959 "System and method for performance-based routing of interactions in a contact center") and for generating agent work schedules.

In addition, historical data on call volume and granular interaction reasons as determined by the analytics server 25 and/or the voice analytics module 44 can be stored in the statistics server 22.

When the WFM system 50 generates the agent work schedule in operation 108 as shown in FIG. 3, the updated skill information from the agent skill database 25a and the analytics server 25, granular call information from the statistics server 22, and other constraints loaded from a WFM database (e.g., stored on mass storage device 54 of the WFM system 50) are used together to forecast expected demand for particular granular interaction reasons for a particular time period and to generate an agent work schedule by matching agent skills and agent effectiveness metrics in addressing the particular granular interaction reasons with the forecasted demand.

Existing methods and algorithms for generating agent work schedules by matching broad or gross interaction reasons (e.g., billing or customer service) with broad or gross agent skills can be applied to generating work schedules based on the granular interaction reasons and the granular measures of agent effectiveness with respect to various skills and ability to resolve granular interaction reasons according to embodiments of the present invention. For example, according to one embodiment of the present invention, a modified Erlang algorithm is used to forecast the call volume for each of the granular interaction reasons and to generate a schedule of agents in accordance with the forecast.

Each of the various servers, controllers, switches, gateways, engines, and/or modules (collectively referred to as servers) in the afore-described figures may be a process or thread, running on one or more processors, in one or more computing devices 1500 (e.g., FIG. 6A, FIG. 6B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 6A:
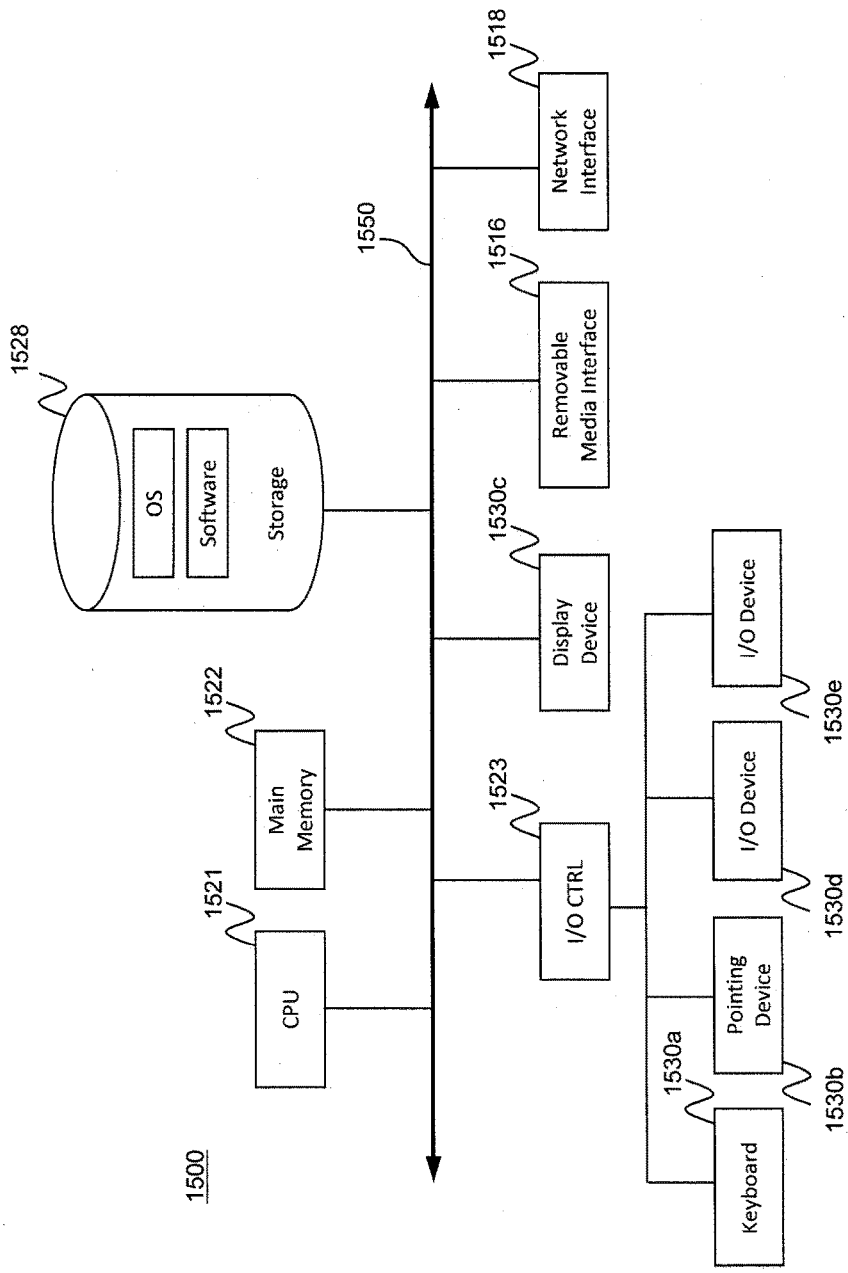
FIG. 6A is a block diagram of a computing device according to an embodiment of the present invention.
Figure 6B:
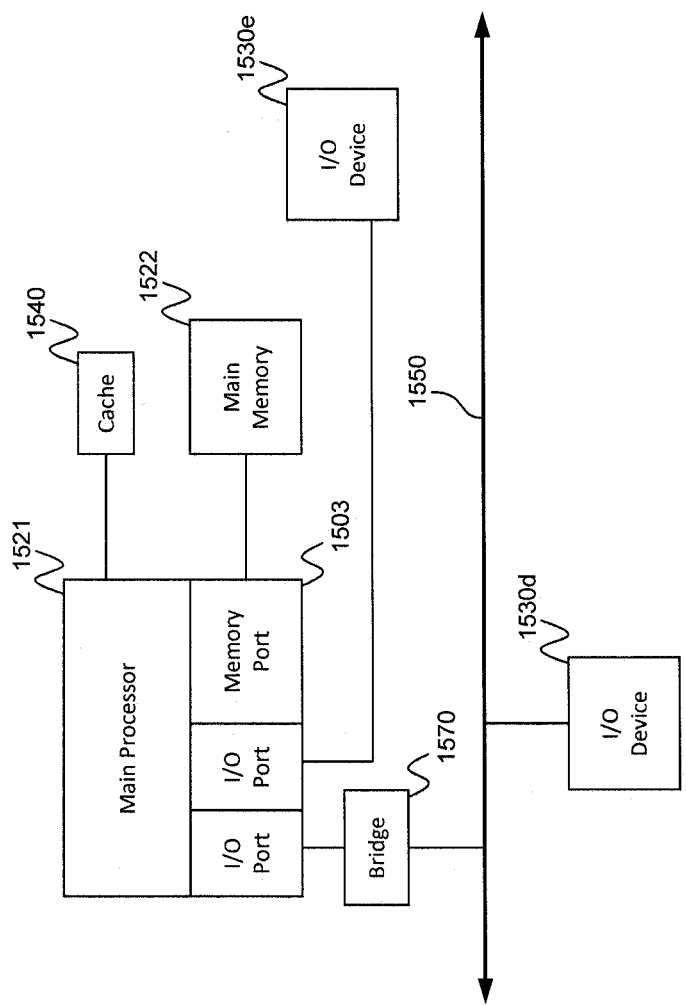
FIG. 6B is a block diagram of a computing device according to an embodiment of the present invention.

FIG. 6A and FIG. 6B depict block diagrams of a computing device 1500 as may be employed in exemplary embodiments of the present invention. Each computing device 1500 includes a central processing unit 1521 and a main memory unit 1522. As shown in FIG. 6A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 6B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 6A, the central processing unit 1521 communicates with the main memory 1522 via a system bus 1550. As shown in FIG. 6B, the central processing unit 1521 may also communicate directly with the main memory 1522 via a memory port 1503.

FIG. 6B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 6A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 6B depicts an embodiment of a computer 1500 in which the central processing unit 1521 communicates directly with I/O device 1530e. FIG. 6B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 6A, may control the I/O devices. The I/O controller may control one or more I/O devices such as a keyboard 1530*a* and a pointing device 1530*b*, e.g., a mouse or optical pen.

Referring again to FIG. 6A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 6A and FIG. 6B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 6D:
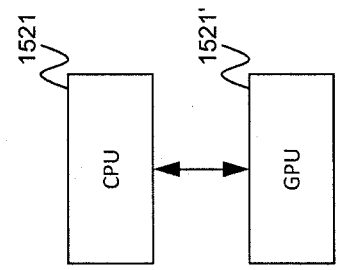
FIG. 6D is a block diagram of a computing device according to an embodiment of the present invention.
Figure 6C:
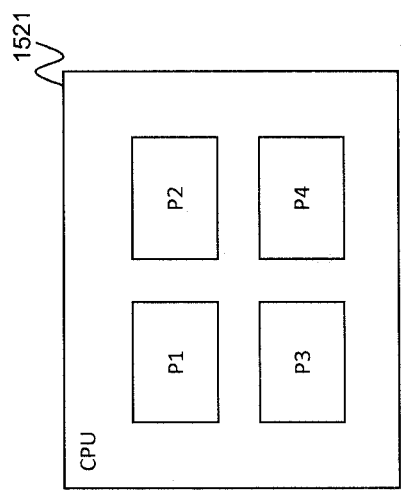
FIG. 6C is a block diagram of a computing device according to an embodiment of the present invention.

As shown in FIG. 6C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 6D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 6E:
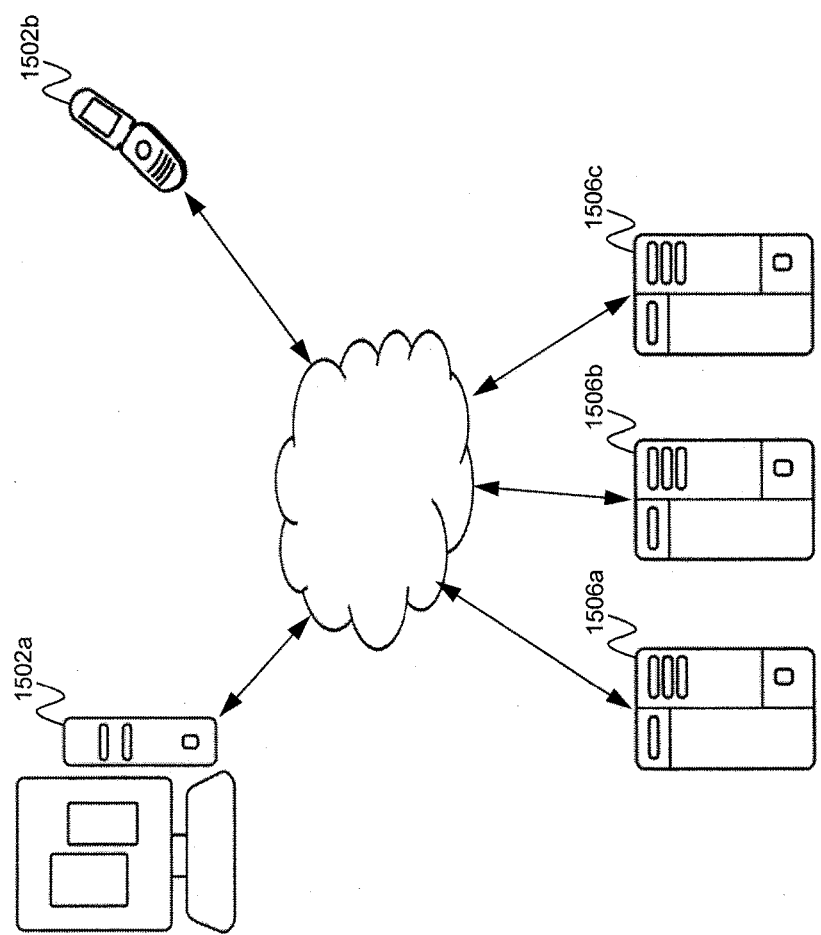
FIG. 6E is a block diagram of a network environment including several computing devices according to an embodiment of the present invention.

A computing device may be one of a plurality of machines connected by a network, or it may include a plurality of machines so connected. FIG. 6E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 6E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 6E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for generating an agent work schedule, the method comprising:
    performing, by a speech or text analytics module hosted on a processor, analytics on a plurality of recorded interactions with a plurality of contact center agents;
    detecting, based on the analytics, specific utterances in the recorded interactions;
    classifying, on the processor, the recorded interactions into a first plurality of interaction reasons and a first plurality of interaction resolution statuses, wherein the classifying is based on the detected specific utterances;
    computing, on the processor, based on the classifying of the recorded interactions, a first agent effectiveness of a first agent and a second agent effectiveness of a second agent of the plurality of agents, wherein the first agent effectiveness and the second agent effectiveness correspond to an interaction reason of the first interaction reasons, the first agent effectiveness being higher than the second agent effectiveness;
    forecasting, on the processor, a demand of the contact center agents for a first time period for handling interactions classified with the interaction reason;
    generating, on the processor, the agent work schedule for the first time period based on the forecasted demand and the first agent effectiveness and the second agent effectiveness, wherein the agent work schedule includes a first number of agents scheduled to work during the first time period that is larger than a second number of agents scheduled to work during the first time period, the first number of agents including the first agent with the first agent effectiveness, and the second number of agents including the second agent with the second agent effectiveness;
    detecting an interaction having the interaction reason during the first time period;
    routing, by an electronic switch, the detected interaction to a particular agent selected from the first and second number of agents;
    analyzing, on the processor, a second plurality of recorded interactions, the analyzing including classifying the second plurality of recorded interactions into a second plurality of interaction reasons and a second plurality of interaction resolution statuses; and
    forecasting, on the processor, a demand of the contact center agents for a second time period for handling the second interaction reasons without forecasting a demand for handling an obsolete interaction reason included in the first plurality of interactions reasons, the second time period being different from the first time period.

2. The method of claim 1, wherein the first agent effectiveness and the second agent effectiveness each comprise an average interaction handling time.

3. The method of claim 2, wherein the agent work schedule is further generated based on an average tare time.

4. The method of claim 1, wherein the analyzing the classified recorded interactions to compute the agent effectiveness of the first and second agents comprises:
    identifying, on the processor, from among the plurality of recorded interactions, a subset of recorded interactions in which the first agent or the second agent participated and which were classified with the interaction reason;
    identifying, on the processor, from among the subset of recorded interactions, a plurality of unresolved interactions in which an interaction resolution status of the interaction resolution statuses associated with the subset of recorded interactions is set as unresolved; and
    computing, on the processor, the first agent effectiveness and the second agent effectiveness with respect to the interaction reason based on a number of unresolved recorded interactions for each agent and a number of interactions for each agent in the subset of recorded interactions.

5. The method of claim 1, further comprising updating, on the processor, the computed first agent effectiveness and the computed second agent effectiveness by analyzing the second plurality of recorded interactions.

6. The method of claim 5, wherein the second interaction reasons comprise at least one new interaction reason different from each of the first interaction reasons.

7. The method of claim 6, wherein the analyzing the classified recorded interactions to compute agent effectiveness of the first and second agents comprises:
identifying, on the processor, from among the plurality of recorded interactions, a subset of recorded interactions in which the first agent or the second agent participated and which were classified with the at least one new interaction reason;
identifying, on the processor, from among the subset of recorded interactions, a plurality of unresolved interactions in which an interaction resolution status of the interaction resolution statuses associated with the subset of recorded interactions is set as unresolved; and
computing, on the processor, the first agent effectiveness and the second agent effectiveness with respect to the at least one new interaction reason based on a number of unresolved recorded interactions for each agent and a number of interactions for each agent in the subset of recorded interactions.

8. The method of claim 6, further comprising forecasting, on the processor, a demand of the contact center agents for a second time period for handling interactions classified with the new interaction reason, the second time period being different from the first time period.

9. The method of claim 1, wherein the obsolete interaction reason is different from each of the second interaction reasons.

10. A system comprising:
a processor; and
memory storing instructions that, when executed on the processor, cause the processor to:
perform, by a speech or text analytics module hosted on the processor, analytics on a plurality of recorded interactions with a plurality of contact center agents;
detect, based on the analytics, specific utterances in the recorded interactions;
classify the recorded interactions into a first plurality of interaction reasons and a plurality of interaction resolution statuses, wherein the classifying is based on the detected specific utterances;
compute, based on the classifying of the recorded interactions, a first agent effectiveness of a first agent and a second agent effectiveness of a second agent of the plurality of agents, wherein the first agent effectiveness and the second agent effectiveness correspond to an interaction reason of the first interaction reasons, the first agent effectiveness being higher than the second agent effectiveness;
forecast a demand of the contact center agents for a first time period for handling interactions classified with the interaction reason;
generate the agent work schedule for the first time period based on the forecasted demand and the first agent effectiveness and the second agent effectiveness, wherein the agent work schedule includes a first number of agents scheduled to work during the first time period that is larger than a second number of agents scheduled to work during the first time period, the first number of agents including the first agent with the first agent effectiveness, and the second number of agents including the second agent with the second agent effectiveness;
detect an interaction having the interaction reason during the first time period;
transmit a signal for routing the detected interaction reasons;
analyze a second plurality of recorded interactions, wherein the instructions that cause the processor to analyze include instructions that cause the processor to classify the second plurality of recorded interactions into a second plurality of interaction reasons and a second plurality of interaction resolution statuses; and
forecast a demand of the contact center agents for a second time period for handling the second interaction reasons without forecasting a demand for handling an obsolete interaction reason included in the first plurality of interactions reasons, the second time period being different from the first time period; and
an electronic switch coupled to the processor, the electronic switch configured to route the detected interaction to a particular agent selected from the first and second number of agents.

11. The system of claim 10, wherein the memory further stores instructions that, when executed by the processor, cause the processor to determine an interaction handling time, wherein the first agent effectiveness and the second agent effectiveness each comprise an average interaction handling time computed from the interaction handling time.

12. The system of claim 11, wherein the agent work schedule is further generated based on an average tare time.

13. The system of claim 10, wherein the instructions stored in the memory that cause the processor to analyze the classified recorded interactions to compute the agent effectiveness of the first and second agents comprise instructions that, when executed by the processor, cause the processor to:
identify, from among the plurality of recorded interactions, a subset of recorded interactions in which the first agent or the second agent participated and which were classified with the interaction reason;
identify, from among the subset of recorded interactions, a plurality of unresolved interactions in which an interaction resolution status of the interaction resolution statuses associated with the subset of recorded interactions is set as unresolved; and
compute the first agent effectiveness and the second agent effectiveness with respect to the interaction reason based on a number of unresolved recorded interactions for each agent and a number of interactions for each agent in the subset of recorded interactions.

14. The system of claim 10, wherein the memory further stores instructions that, when executed by the processor, cause the processor to update the computed first agent effectiveness and the computed second agent effectiveness by analyzing the second plurality of recorded interactions.

15. The system of claim 14, wherein the second interaction reasons comprise at least one new interaction reason different from each of the first interaction reasons.

16. The system of claim 15, wherein the instructions stored in the memory that cause the processor to compute agent effectiveness of the first and second agents comprise instructions that, when executed by the processor, cause the processor to:
identify, from among the plurality of recorded interactions, a subset of recorded interactions in which the first agent or the second agent participated and which were classified with the at least one new interaction reason;
identify, from among the subset of recorded interactions, a plurality of unresolved interactions in which an interaction resolution status of the interaction resolution statuses associated with the subset of recorded interactions is set as unresolved; and
compute the first agent effectiveness and the second agent effectiveness with respect to the at least one new interaction reason based on a number of unresolved recorded interactions for each agent and a number of interactions for each agent in the subset of recorded interactions.

17. The system of claim 15, wherein the memory further stores instructions that, when executed by the processor, cause the processor to forecast a demand of the contact center agents for a second time period for handling interactions classified with the new interaction reason, the second time period being different from the first time period.

18. The system of claim 14, wherein the obsolete interaction reason is different from each of the second interaction reasons.

19. The method of claim 1, wherein the first agent effectiveness and the second agent effectiveness correspond to a sub-category of the interaction reason of the first interaction reasons.

20. The system of claim 10, wherein the first agent effectiveness and the second agent effectiveness correspond to a sub-category of the interaction reason of the first interaction reasons.

21. The method of claim 1 further comprising:
    updating a skill set associated with the first agent based on the first agent effectiveness.

* * * * *